United States Patent
Tiesnitsch

(10) Patent No.: US 8,794,819 B2
(45) Date of Patent: *Aug. 5, 2014

(54) EXTRUDER WITH FEED-BACK MEANS

(75) Inventor: Johannes Ijsbrand Tiesnitsch, Weert (NL)

(73) Assignee: Xplore Instruments B.V., Geleen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,281

(22) Filed: Jun. 22, 2012

(65) Prior Publication Data

US 2012/0263008 A1 Oct. 18, 2012

Related U.S. Application Data

(63) Continuation of application No. 11/795,402, filed as application No. PCT/EP2006/000522 on Jan. 17, 2006, now Pat. No. 8,231,264.

(30) Foreign Application Priority Data

Jan. 21, 2005 (EP) ..................................... 05075139

(51) Int. Cl.
- *B29B 7/66* (2006.01)
- *B01F 15/02* (2006.01)
- *A21C 1/06* (2006.01)
- *B29C 47/72* (2006.01)
- *B29C 47/00* (2006.01)

(52) U.S. Cl.
CPC ............. *B29C 47/725* (2013.01); *B29C 47/011* (2013.01); *B29C 47/0021* (2013.01)
USPC ............... 366/89; 366/79; 366/131; 366/133; 366/136; 366/137; 425/215

(58) Field of Classification Search
CPC .............. B29C 47/725; B29C 47/0011; B29C 47/0021
USPC ...................... 366/79, 131, 133, 136, 137, 89; 425/215
See application file for complete search history.

(56) References Cited

U.S. PATENT DOCUMENTS

| 4,472,059 A * | 9/1984 | Klein et al. ...................... 366/79 |
| 4,695,240 A * | 9/1987 | Li et al. .......................... 425/207 |
| 4,897,236 A * | 1/1990 | Rabiger et al. ........... 264/211.23 |
| 6,129,450 A * | 10/2000 | Braun .............................. 366/83 |
| 2005/0063246 A1 | 3/2005 | Ponzielli |

FOREIGN PATENT DOCUMENTS

| JP | 54-154464 | 12/1979 |
| JP | 2001-071708 | 3/2001 |
| JP | 2004-351930 | 12/2001 |
| JP | 2003-135428 | 5/2003 |

* cited by examiner

Primary Examiner — Nathan Bowers
Assistant Examiner — Gautam Prakash
(74) Attorney, Agent, or Firm — Nixon & Vanderhye P.C.

(57) ABSTRACT

Extruders for processing material have a selectively variable extruder volume. The extruders include an extruder barrel containing a bore sized to process 5 to 50 grams of material, wherein the bore has an upstream inlet portion for feeding the material to be processed and a downstream outlet portion connectable to an extruder exit for material processed through the extruder, and at least two recycle channels which differ from one another in at least one of volume, area of cross-section and length. A diverter valve of a flow control system is positioned at the outlet of the extruder for controllably directing material flow from the bore to either the extruder exit or at least one of at least two recycle channels.

4 Claims, 1 Drawing Sheet

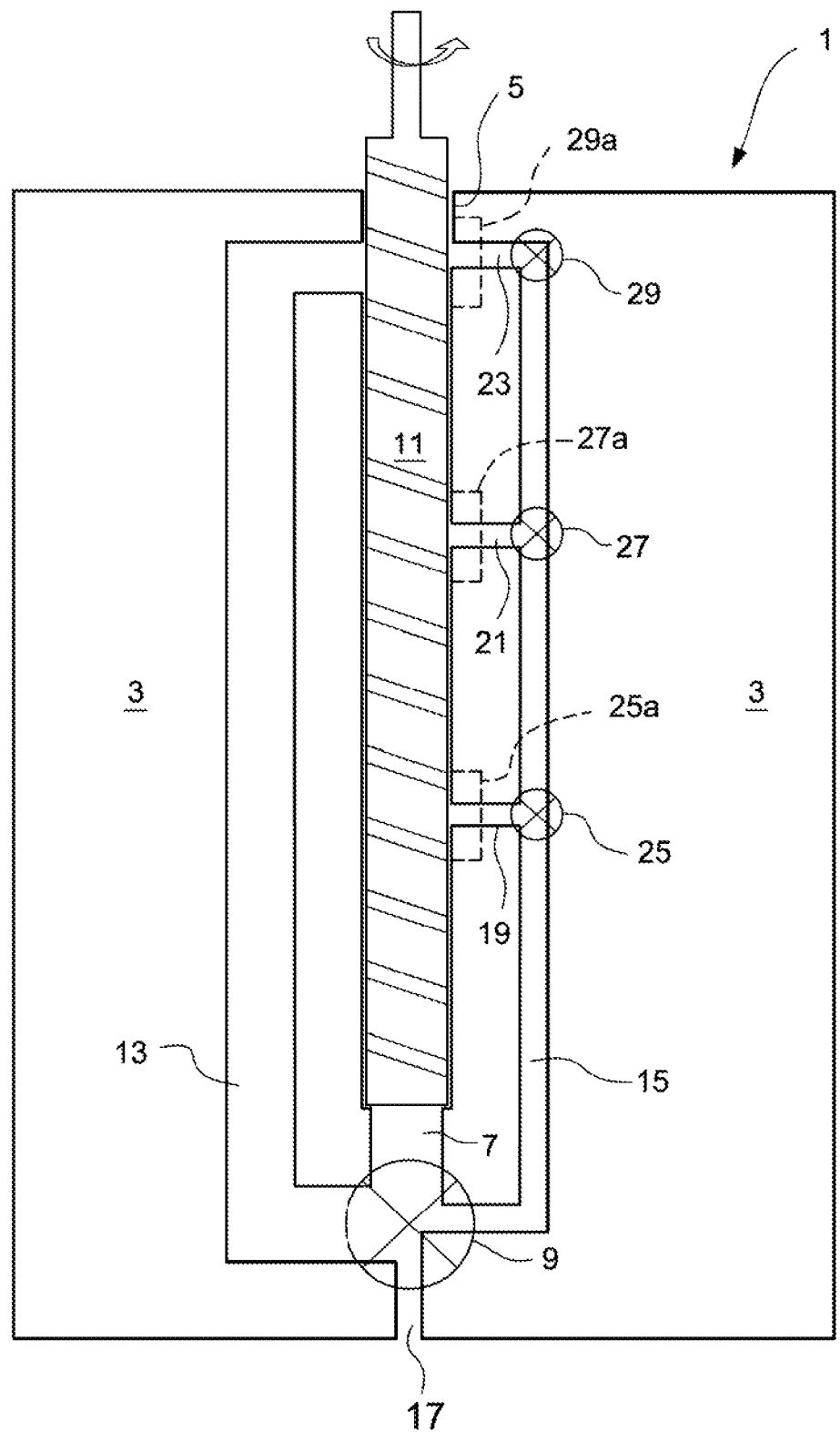

EXTRUDER WITH FEED-BACK MEANS

CROSS-REFERENCE TO RELATED APPLICATIONS

This application is a continuation of U.S. application Ser. No. 11/795,402, filed Aug. 27, 2008 (now U.S. Pat. No. 8,231,264), which is the national phase application of international Application PCT/EP2006/000522, filed Jan. 17, 2006 which designated the U.S. and claims benefit of EP 05075139.5, dated Jan. 21, 2005, the entire contents of each of which are hereby incorporated by reference.

FIELD

The invention relates to an extruder for processing material, comprising an extruder barrel containing a bore and at least one extruder screw position within said bore, the bore having an upstream inlet portion for feeding the material to be processed and a downstream outlet portion connectable to an extruder exit for material processed through the extruder.

BACKGROUND AND SUMMARY

Depending on the type of material the processing may involve mixing, kneading, and/or melting. E.g. thermoplastic materials, in particular polymers or polymer blends, can be molten in a heated extruder and shaped in the molten state, e.g. as test samples. In the same process additives may be mixed in. Other, non-thermoplastic materials, e.g. food or other edible materials, may be mixed with other components in the extruder and as a mixture be given a desired shape, e.g. a film and granules.

In particular extruder according to the invention is an extruder having a limited size and effective volume, making it suitable for melting and mixing polymers that are available only in small amounts. Their throughput may range from 0.05 g/min to some 10 g/min or, in case the extruder is a batch type one, their effective volume may range from 5 to 50 ml. Extruders of this type may be particularly applied in a laboratory environment for processing experimental material grades ands mixtures, which use to be available only in small quantities, into test samples. Available quantities may range from 50 g down to 15 g and even only 5 grams. The shaping into test samples is carried out in a manner known from industrial extruders by feeding the mixed and/or molten material to a downstream exit of the extruder bore through a die or into a mould, each of a proper shape.

Such an extruder is known from U.S. Pat. No. 4,695,240. This publication teaches that small extruders cannot easily be constructed by downscaling large-scale industrial extruders. To achieve sufficient residence time the extruder barrels would have to be relatively long, whereas the extruder screw then becomes relatively thin. Screw failure due to the high torsion forces caused by the changing viscosity of the polymer to be processed is to be expected. The problems associated with downscaling are resolved there by introducing a heat separation zone between the Inlet and the outlet portion of the extruder bore. It is alleged that their construction eliminates the problem of premature failure to the extruder screws associated with scaled down conventional extruder apparatus. In the document, however, it is not disclosed how the proposed measure does eliminate the problem.

Aim of the invention is to provide an extruder, having a solid construction and suitable to process a variety of small available amounts of polymer.

This aim is achieved according to the invention in that the at least one extruder screw has a length:diameter ratio of less than 20:1, in that the extruder further comprises at least one recycling channel running through the barrel from the outlet portion of the bore and at least two recycling exits that connect a recycling channel to the bore upstream of the outlet portion, and in that it further comprises a flow control system for directing the material through the at least one recycling channel and the recycling exits and/or the extruder exit.

Thus in the extruder according to the invention the at least one screw is favorably solid whereas by directing the material stream in the extruder through the recycling channel(s) to specific recycling exits the effective volume of material that can be cycled through the extruder can be varied, adapting the extruder to the amount of material available.

BRIEF DESCRIPTION OF THE DRAWING

An embodiment of the invention is further elucidated by the following drawing, in which FIG. 1 is a cross section of a single-screw extruder having two recycling channels, one of those having more than one recycling exit. FIG. 1 represents one of the working examples of the present invention, but is not limiting to the scope of the present invention.

DETAILED DESCRIPTION OF THE EXEMPLARY EMBODIMENT

In one preferred embodiment the extruder comprises a recycling channel having at least two recycling exits. This requires only one channel to be present in the barrel and nevertheless provides an extruder of which the effective volume can be varied. By selecting one of the at least two recycling exits the length of the channel that is actually used to circulate the material can be varied and accordingly the volume used. Valves disposed between the channel and the recycling exits as means for directing the material can be operated to choose the desired volume. Usually at least one recycling exit ends into the inlet part of the bore and further exits end at a more downstream position. The more downstream the exit that is used, the shorter is the time that the material is mixed and otherwise processed by the extruder screw. This offers the opportunity to choose a desired balance between the period during which the material is just transported through the channel and that during which it is kneaded and mixed by the extruder screw.

In another preferred embodiment at least two recycling channels, each having at least one recycling exit are present. Thus e.g. by properly placed valves none, one or two of the channels can be used for adapting the volume of the material circulating in the extruder. In a particularly preferred embodiment the at least two recycling channels have different volumes, e.g. created by different cross sectional areas or different lengths. In an alternative method for adapting the volume of a recycling channel, this channel extends beyond the most upstream recycling exit and ends in an opening in the wall of the extruder housing. From the outside then a bar closely fitting in the recycling channel can be shoved into the channel to block one or more of the recycling exits, thus forcing the recycling material to flow through the recycling channels that are not blocked by the bar. By shoving the bar less or more deep into the recycling channel the number of recycling exits blocked can be chosen. In the case the barrel consists of 2 or more parts, that can be pivoted away to free the extruder screw, inserts can be used, to block recycle exits or to connect them to the recycle channel as desired. An advantage of these alternative methods is that no valves are needed to open and close the recycling exits.

Also combinations of recycling channels having only one or having more recycling exits or having different lengths or cross sections can be present, offering a broad variety of effective volumes. Having channels with different cross sectional areas makes the extruder fit to process materials having different melt viscosities, a narrower channel being fit for high viscosities, a wider channel for lower viscosity type materials.

By circulating the polymer to be processed for a certain period of time through the extruder bore and any connected recycling channels before actually feeding the processed material to the extruder exit, a proper processing time for the desired degree of heating and mixing the available amount of polymer can be achieved. The extruder thus removes the necessity to have several different extruders at hand each matched to process a certain amount of polymer. This is in particular relevant for laboratory environments, where only small experimental amount of material tend to be present.

From U.S. Pat. No. 6,129,450 a small extruder is known in which a feedback channel is present, connecting the inlet and outlet part of the extruder bore. The polymer to be processed is circulated from the bore into the feedback channel in order to obtain a laminar flow on which certain rheological parameters are measured by sensors in the feedback channel. The diameter of the channel must be rather wide in order to obtain a stationary laminar flow.

In this document the insight underlying the present invention, viz. that by providing at least two different exits into the extruder bore an extruder having various effective volumes can be created, is absent.

The extruder is designed such that the length of the at least one screw is relatively short compared to its diameter, their ration being less than 20:1, preferably less than 15:1 or even less than 10:1. When a conical screw is applied then the diameter is to be read as its largest diameter. Such screws can more easily withstand the torsion forces exerted by the processing of polymer material through the barrel than the known downscaled screws.

Extruders as such are known in the art and usually comprise a metal housing a barrel containing a hollow, mainly axial, bore in which one or more rotating screws having mixing and transport functionality are present. At the upstream inlet portion of the bore an inlet is present to feed the material to be processed into the extruder. The material fed is processed by the rotation of the at least one screw, whereby the barrel may be heated to melt the material and suitable screw configuration causes proper mixing and transporting to the downstream outlet portion of the barrel. The bore ends into an exit opening to outside the extruder allowing the mixed and/or molten material to leave the extruder under the transporting action of the at least one screw. The extruder exit opening can be provided with a die making the material to leave in the shape of that die, which shape then is retained by cooling the molten outlet stream. The outlet can also be connected to a mould containing a cavity of a desired shape. This cavity is filled then with molten material and after cooling an object having the shape of the cavity is obtained. Such cavity can e.g. have the shape of the prescribed test sample for certain test procedure.

In the extruder according to the invention at least one channel and at least two recycling exits are present that connect the outlet portion of the bore to a position upstream thereof. In this way loops can be created through which the material transported by the screws on arrival at the output portion of the bore flows into one or more of the recycling channels and through these channel(s) through one or more recycling exits back to the bore, where it is fed to the screw(s) again and moves downstream again through the barrel. Thus the stream of molten polymer can circulate until it has been mixed and molten to a sufficient extent for expelling it through the extruder exit and giving it the desired shape as described before.

In a preferred embodiment at least one recycling channel is present that has at least two recycling outlets into the bore. In this way it is possible to realize two and even three different effective volumes by only one recycling channel, which makes the construction easier.

In another preferred embodiment at least two recycling channels are present that differ in their volume, e.g. caused by a difference in length and/or by a difference in their cross sectional area perpendicular to their length direction.

In yet another embodiment at least two recycling channels are present that differ in the area of their cross section and or their length.

These differences allow a wide variation in recycle volumes, and when channels having different cross-sections are present, to allow compositions having viscosities to be recycled. The larger cross-section channel than allows higher viscosity materials to be recycled, the smaller cross section channel can be used for easier flowing materials.

A proper valve system is present between the outlet portion of the barrel and the extruder exit and, if applicable within a recycling channel having more than one recycling exit, in order to select the desired flow paths through one or more of the recycling channels and to one or more of the exits or directly to the extruder exit. The channels normally run through the barrel but they may also run outside it. If materials are processed in a molten state, the barrel and any outside running channel are heated in order to keep the material flowing through them in a molten state.

The shape of the bore may be cylindrical or conical. In case two screws are present the bore is substantially eight-shaped with two partly coinciding cylindrical or conical bores, in each bore a cylindrical or conical screw being present. Such constructions are known per se for single or multi-screw extruders. Also extruders having more than two screws are known in the art and can be applied in the extruder according to the invention. If two screws are present these screws may be counter-rotating but preferably they are co-rotating. This has appeared to be a highly effective arrangement for rapid mixing and it ensures a defined transportation path.

In FIG. 1 an extruder 1 is shown with extruder barrel 3. In barrel 3 a cylindrical bore 5 is present, ending at its downstream outlet portion in an extruder exit 7. The exit is connected to a three-way valve 9 that can direct the material stream transported downstream by extruder screw 11 to one or both of recycling channels 13 and 15 for recirculation or to exit 17 for leaving the extruder. Exit 17 can be designed to give a desired shape to the material stream leaving it or a die (not shown) having the desired outlet shape can be connected to the exit 17 for that purpose.

Channel 15 has three recycling exits 19, 21 and 23 opening into bore 5 at different heights upstream. Valves 25, 27 and 29 are present for opening and closing exits 19, 21 and/or 23 as desired, thus varying the effective extruder volume and/or the recycling time and the kneading/mixing part of the total recycling time. Valve 29 can be omitted and mainly serves to prevent material from entering from the extruder bore into the exit channel 23, which might occur when the extruder becomes overfed. For the same reason a valve may be present in the recycling exit at the upstream end of recycling channel 13. Inserts 25a, 27a and 29a may be provided as an alternative to the valves 25, 27 and 29 so as to block or connect recycle exits 19, 21 and 23, respectively, to the recycle channel 15.

Channel 13 with a diameter different than channel 15 runs directly from the outlet portion of bore 7 back to the inlet portion thereof. The feed channel for feeding the basic unprocessed material to the extruder is not shown in this drawing and resides upstream of recycling exit 23.

The invention claimed is:

1. An extruder for processing material and having a selectively variable extruder volume, the extruder comprising:
    an extruder barrel containing a bore sized to process 5 to 50 grams of material, wherein the bore has an upstream inlet portion for feeding the material to be processed and a downstream outlet portion connectable to an extruder exit for material processed through the extruder,
    at least one extruder screw positioned within the bore, wherein the at least one extruder screw has a length:diameter ratio of less than 20:1,
    at least two recycle channels which differ from one another in at least one of volume, area of cross-section and length, and
    a flow control system including a diverter valve positioned at the outlet of the extruder for controllably directing material flow from the bore to either the extruder exit or at least one of the at least two recycle channels.

2. The extruder according to claim 1, wherein the selectively variable extruder volume ranges from 5 to 50 ml.

3. The extruder according to claim 1 or 2, wherein the length:diameter ratio is less than 15:1.

4. The extruder according to claim 1 or 2, comprising two co-rotating extruder screws.

\* \* \* \* \*